United States Patent
Robbins et al.

(10) Patent No.: US 6,532,463 B1
(45) Date of Patent: Mar. 11, 2003

(54) WEB PAGE ACCESSING OF DATA BASES AND MAINFRAMES

(75) Inventors: James Earl Robbins, Gainesville, FL (US); Alan Russell Cook, Gainesville, FL (US); Michael Wayne Lucas, Gainesville, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 09/203,686

(22) Filed: Dec. 1, 1998

(51) Int. Cl.[7] .................. G06F 17/30; H04L 9/00
(52) U.S. Cl. .................. 707/9; 707/10; 713/182
(58) Field of Search .................. 707/9, 10; 709/200, 709/202, 203, 217, 218, 219; 713/168, 171, 182, 200, 201, 202

(56) References Cited

U.S. PATENT DOCUMENTS

| | | | | |
|---|---|---|---|---|
| 5,715,453 A | * | 2/1998 | Stewart | 707/104 |
| 5,793,964 A | * | 8/1998 | Rogers et al. | 709/202 |
| 5,835,923 A | * | 11/1998 | Shibata et al. | 707/526 |
| 5,926,180 A | * | 7/1999 | Shimamura | 345/357 |
| 5,945,989 A | * | 8/1999 | Freishtat et al. | 345/329 |
| 5,974,418 A | * | 10/1999 | Blinn et al. | 707/100 |
| 5,974,441 A | * | 10/1999 | Rogers et al. | 709/200 |
| 6,003,094 A | * | 12/1999 | Dean | 709/303 |
| 6,023,684 A | * | 2/2000 | Pearson | 705/35 |
| 6,041,365 A | * | 3/2000 | Kleinerman | 709/302 |
| 6,057,854 A | * | 5/2000 | Davis, Jr. et al. | 345/433 |
| 6,067,579 A | * | 5/2000 | Hardman et al. | 709/328 |
| 6,115,040 A | * | 9/2000 | Bladow et al. | 345/335 |
| 6,178,418 B1 | * | 1/2001 | Singer | 707/3 |
| 6,216,164 B1 | | 4/2001 | Zaremba, Jr. | |
| 6,226,750 B1 | * | 5/2001 | Trieger | 713/201 |
| 6,385,644 B1 | * | 5/2002 | Devine et al. | 709/206 |

\* cited by examiner

*Primary Examiner*—Safet Metjahic
*Assistant Examiner*—Uyen Le
(74) *Attorney, Agent, or Firm*—Miles & Stockbridge; Dennis P. Clarke (57) ABSTRACT

A method of providing Web access to data using dynamic generation of Web pages by a mainframe computer connected to a Web server. The mainframe computer has legacy programs, legacy data, and legacy subroutines on it (Legacy means existing information systems which may not be specifically adapted to Web access). A Web control program on the mainframe marries file definition objects and page definition objects to generate Web pages and allow a Web user to access legacy data stored in databases on the mainframe. A state key is generated by the mainframe upon a user inputting identification data and the state key is then incorporated into the Web page generated by the Web control program. By receiving the state key back from the user, the Web control program determines the extent of access allowed to a particular user without the user having to reenter identification data. The Web control program allows one to manage and change the appearance of Web pages.

9 Claims, 6 Drawing Sheets

VERIFY STUDENT ID

Enter Social Security No. ☐

Enter Your PIN ☐

FIG. 3

YOU HAVE GRADES FOR 8 CREDITS

| Course | Credit | Grade | |
|--------|--------|-------|---|
| AGC2021 | 04 | A | |
| ECO3100 | 04 | C | ⌐ ─ ─ ┐ | hidden state key

WEB PAGE ACCESSING OF DATA BASES AND MAINFRAMES

COPYRIGHT

A portion of the disclosure of this patent document contains material which is subject to copyright protection. The copyright owner has no objection to the facsimile reproduction by any one of the patent disclosure, as it appears in the Patent and Trademark office patent files or records, but otherwise reserves all copyright rights whatsoever.

BACKGROUND OF THE INVENTION

The present invention relates to distribution of information over a computer network using hypertext links and Web pages. More specifically, the present invention relates to information distribution by interaction of a Web page on a client, a Web server connected to the client via the Internet, and programs, such as a database program, on a mainframe computer.

The explosive growth of the Internet over the last several years has dramatically improved the ability to quickly distribute vast amounts of data to any interested person. Additionally, the use of cookies, Secure Sockets Layers (SSL), and numerous other techniques have allowed the Internet to provide distribution of information restricted to an authorized person only.

An example may best illustrate some considerations in the situation. A book store may have a Web server that allows customers and potential customers access to information. The information might be "unrestricted access" information such as a list of books that the book store is willing to sell. The information might be "customer specific" information, such as the list of books currently under order by a customer, the customer's account balance, or other such information that should be accessible only to the given customer (apart from appropriate employees of the book store who may need access to such restricted information). Moreover, there might be information available to a class of customers, but which should not be accessible by all persons. Thus, a list of books at special discounted prices could be available to any member of a preferred buyer group, but not to others.

Regardless of whether information is unrestricted, restricted to a single user, or has some intermediate level of restriction, distribution of the information via the Web requires that a Web server handle the information. Several methods exist to enable the Web server to handle the information.

The most direct technique is for the book store's programmers or other employees to put the information on the Web server. Thus, a book store setting up a Web site can simply take its list of books from whatever computer it is currently stored on and reformat the list as needed. However, when the list is updated at its current storage location (such as a mainframe computer), the book store's employees would also have to update the list on the Web server. The disadvantages of requiring the same information to be updated at multiple storage locations (such as in the mainframe computer and in the Web server), the possibility of data updates being made inconsistently, and the increase in storage demands required when the data must be stored in one location (such as a mainframe) for internal company use and in another location (such as a Web server) for access via the internet or other outside access.

Another technique for providing Web access to data is for the book store's programmers to write specific interface programs to translate data stored in a database on the book store's mainframe computer. For example, an interface program can convert database data into hypertext markup language (HTML) such that a Web browser may display the data as a Web page. However, generating such interface programs requires skills that may be outside the experience of the employees who manage the mainframe and its databases. Further, such interface programs may be required for different types of data access. If a list of available books is stored in one database with a given format, and a list of customers is stored in a different format in a different database, a different interface program may be required for each. Considering also that a list of book publishers may be stored in yet another format and that the book store might allow each book publisher to view its own account information, yet another interface program would have to be developed. Developing interface programs for each database or each data format is expensive and time-consuming.

In addition to problems associated with allowing Web access to data on mainframe databases, security considerations often complicate access to information. For example, if the book store wanted to allow customers access to details about the status of their book orders or their account, the Web server often places a so-called cookie on the customer's computer. The cookie is a small file of data or code identifying the customer□s computer to the Web server. However, many computer users do not want their computers accepting cookies from Web servers and they therefore limit the use of this. A further problem with some Web access security arrangements is that some are too easily overcome. For example, a person may "spoof" another's identity (impersonate another) in order to obtain restricted data.

Yet another consideration in distributing large amounts of data via the Internet is the need to be able to manage and administer a Web site. Often Web site management requires complex knowledge and considerable effort. Changing the appearance of a Web page (such as changing the presentation of data on a Web page) can be a time-consuming process which requires highly specialized expertise. (As used herein, changing the appearance means causing the Web page to appear differently to all who access it by causing it to display data from the computer storing the Web page, and shall not include simply appending user comments or designs to a Web page as is common for Web-based bulletin board or public comment boards.)

OBJECTS AND SUMMARY OF THE INVENTION

Accordingly, it is a primary object of the present invention to provide a new and improved technique of distributing data via the Internet or other computer network, bulletin board, etc.

A more specific object of the present invention is to provide for Internet distribution of data stored in a database without the need for storing the data on a Web server.

A further object of the present invention is to provide ready Web access to data stored in various formats without the need to develop different programs.

Yet another object of the present invention is to provide a new and improved security arrangement for limiting access to Web data to authorized users.

A further object of the present invention is to provide convenient management of a Web site without requiring advanced programming skills or expertise in HTML.

The above and other features of the present invention which will be more readily understood when the following detailed description is considered in conjunction with the accompanying drawings are realized by a method of providing Web access to data. A Web server for distribution of data to users is provided. A database is provided on a database computer operably connected to the Web server, the database having a database program that provides data in a given format. Upon a user requesting data in the database, the Web server forwards the request to the database, the database program accesses the data in the given format. The database computer runs a Web control program that generates a Web page with the requested data and supplies the generated Web page to the user. The Web control program marries file definition objects and page definition objects to generate Web pages. The Web server is on a Web server computer different from the database computer. The database computer is a mainframe computer. The mainframe computer supplies the generated Web page to the user via the Web server computer. Upon a user requesting data not in the mainframe computer, the Web control program causes the mainframe computer to access data on a remote computer and the Web control program then generates a Web page with the requested data and supplies the generated Web page to the user. Responsive to a user, the Web control program calls a subroutine on the mainframe computer, which subroutine is independent of the Web control program and is a legacy subroutine. The method further includes the steps of: having a user supply an identification code, forwarding the identification code from the Web server computer to the mainframe computer, the Web control program then generating a state key, incorporating the state key into a Web page supplied to that user, and wherein the mainframe computer detects the state key from the Web page upon the user requesting data and decides whether that user can access the requested data based on the state key. The state key is randomly generated for a given access session and the state key loses its ability to authorize data access if it is not sent by the user to the mainframe computer at least once during a time-out interval. The Web control program receives a page change command from a user using a Web browser and, responsive to the page change command, the Web control program changes a given Web page to a changed Web page such that any users accessing the given Web page now receive the changed Web page, the page change command changing the appearance of a given Web page.

The present invention may alternately be described as a method of providing Web access to data, the steps including: providing a Web server for distribution of data to users; providing a database on a database computer operably connected to the Web server, the database having a database program that provides data in a given format; providing a Web control program on the database computer; having a user supply an identification code to the Web server, the Web control program then generating a state key and incorporating the state key into a Web page supplied to that user, and wherein the database computer detects the state key from the Web page upon the user requesting data and decides whether that user can access the requested data based on the state key. The state key loses its ability to authorize data access if it is not sent by the user to the database computer at least once during a time-out interval. The Web server is on a Web server computer different from the database computer. The method of further includes the step of forwarding the identification code from the Web server to the database computer. The database computer is a mainframe computer. The state key is randomly generated for a given access session.

The present invention may alternately be described as a method of managing a Web site, the steps including: providing a Web control program on a computer; having the Web control program receive a page change command from a user using a Web browser to access the Web site; and, responsive to the page change command, the Web control program changing a given Web page to a changed Web page such that any users accessing the given Web page now receive the changed Web page, the page change command changing the appearance of a given Web page. The Web control program marries file definition objects and page definition objects to generate Web pages.

The computer having the Web control program is a mainframe computer and users request data on the mainframe computer via a Web server on a Web server computer. The Web control program generates HTML through a completely table driven process, independent of file definitions and page definitions. The method further includes the steps of: having a user supply an identification code, forwarding the identification code from the Web server computer to the mainframe computer, the Web control program then generating a state key, incorporating the state key into a Web page supplied to that user, and wherein the mainframe computer detects the state key from the Web page upon the user requesting data and decides whether that user can access the requested data based on the state key.

The method further includes the steps of: providing a database on the mainframe computer, the database having a database program that provides data in a given format; upon a user requesting data in the database, the Web server forwarding the request to the database, the database program accessing the data in the given format, and, by operation of the Web control program, generating a Web page with the requested data and supplying the generated Web page to the user.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
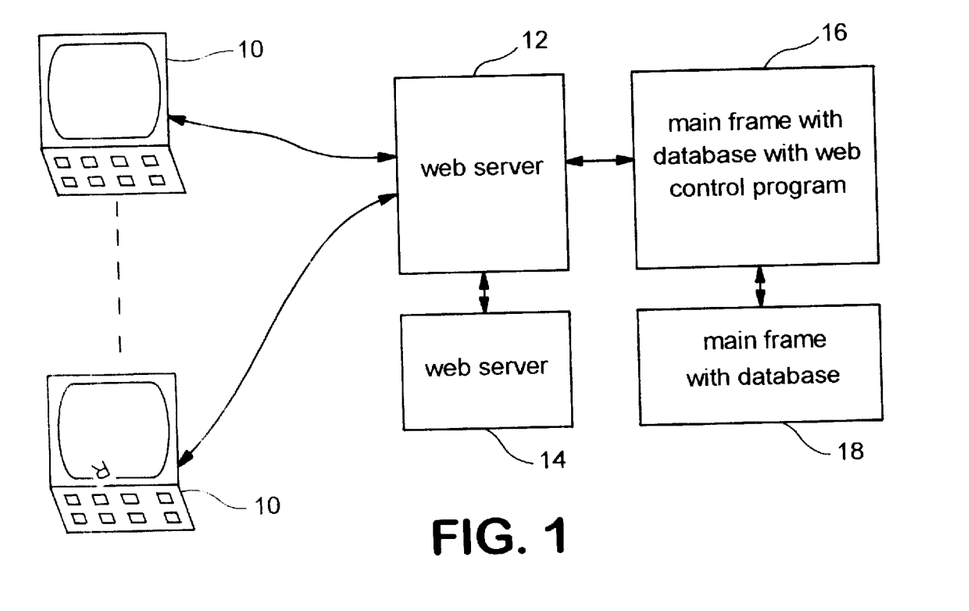
FIG. 1 is a simplified diagram of the arrangement used for the present invention.

Turning now to FIG. 1, some very basic concepts of the present invention will be discussed. Users accessing the World Wide Web of the Internet use their computers 10 running a Web browser program to access a Web server 12. (For ease of illustration, connections intermediate to the computers 10 and Web server 12, such as computers of an Internet service provider, are not shown.) The Web server 12 may be connected to receive information from another Web server such as 14. Additionally, the Web server 12 is connected to a mainframe computer 16 that has legacy programs, legacy data, and legacy subroutines on it. (Legacy means existing information systems which may not be specifically adapted to Web access).

Previously, and as discussed in the background above, providing access to data on the mainframe via the Web required one to select from a number of unattractive options. The data could be duplicated on the Web server with the associated expansion in storage demands and increase in complexity in updating data (the data would have to be changed at each location where it is stored). Alternately, specific programs could be developed to allow Web access to particular data in the mainframe.

Advantageously, the present invention uses a Web control program that can generate Web pages in response to requests by users at computers 10. The Web control program runs on the mainframe 16 and generates the HTML needed to display particular data as part of a Web page. The Web access program on computer 16 additionally may, in response to a request for data that is not stored on mainframe computer 16, send a request for the data to another mainframe 18, receive the requested data back, put it into Web format (i.e., mark it up into HTML), and supply the Web page to the user. The mainframe computer 16 can access data at other computers by EDI (electronic data interchange), over TCP/IP (transport control protocol/internet protocol) or other protocols.

The Web control program is part of a Web management system also including a program that runs on the Web server 12, which Web server is preferably running on a separate computer from the database-holding mainframe computer 16. In the discussion that follows, the Web management system will be referred to by the name EAGLE (Enhanced Application Generation Language for the Enterprise). EAGLE consists of several different and distinct parts including:

There is a C program that runs as a CGI (common gateway interface) program on a Web server to extract and format data from forms that are submitted from a Web browser.

There is a routing mechanism and a management structure for invoking CICS programs that can (Note: CICS is an IBM trademark.) produce Web pages. (As used herein, CICS stands for customer information control system running on the mainframe.) These pages can be created in any one of the three methods described below. Pages that are generated may then be interactively enhanced with styles, buttons, files to be read and/or updated, subroutines to be called, and many other variables using CICS-created objects.

There is a state engine that keeps track of Web users and is able to maintain a session for Web users as well as do timeouts and re-establish sessions using CICS programs.

There is a CICS-based HTML generator that allows interactive creation of Web pages that can manipulate mainframe databases by reading, browsing, and updating VSAM and DB2. This one module can manage any number of different files, including fixed-length and segmented VSAM files, as well as DB2 databases. This program uses CICS-created objects for HTML generation including (but not limited to) file definitions, page definitions, drop-down lists, and Web page text.

In the same fashion that the simplified diagram of FIG. 1 leaves out the connections intermediate to the computers 10 and Web server 12 as mentioned above, it will be readily understood that various other computers similar to 10, Web servers similar to 12 and 14, and main frames similar to 16 and 18 and connections there between are not shown in FIG. 1.

There is a set of development tools that facilitate the writing of EAGLE subroutines by generating object modules from simple templates that at the same time allow very flexible customizing of the modules. These object modules have the ability to read, browse, and update mainframe databases including VSAM (a specific brand name of indexed file structure) and DB2. (a specific database).

Programs can be written and executed in any CICS-supported language without using any of the EAGLE development tools.

This product can send and receive TCP/IP requests from any TCP/IP enabled source including Internet e-mail.

Except for the C program that resides on the Web server, all of the programs are written in CICS Command Level Assembler language and run on IBM mainframes. This allows a level of security and scalability not found in other multi-tiered products. This would be especially useful in providing legacy mainframe systems and databases with Web access.

All of the CICS objects necessary for operating EAGLE are created and maintained via the Web using EAGLE itself or by using mainframe terminal sessions (i.e., IBM3270).

Before supplying some specific examples of the Web management system in operation, some highly advantageous aspects of EAGLE will be discussed.

The combination of a CICS-based state engine and a program management structure that allows dynamic invocation of CICS programs means that the Web pages managed by EAGLE are associated with CICS-based objects that can be created and maintained interactively via the Web. Any Web page which is a part of EAGLE may call any subroutine, specify any files, pass variable data to the called subroutine, invoke additional subroutines or pages by way of return codes to the routing mechanism (error processing, rerouting of a request, pages by way of return codes to the routing mechanism (error processing, rerouting of a request, etc.) These pages may require a PIN or other user authentication, invoke a process external to CICS, use a variable style-sheet, and include button objects. The flexibility of this system provides other features too numerous to mention here.

The ability to generate subroutines from CICS-based page templates that can be attached to EAGLE easily and seamlessly is another advantageous feature of EAGLE.

The existence of one single CICS program that can marry file definition objects and page definition objects resulting in the creation of a Web page that allows reading, updating, adding, deleting and browsing of VSAM files is an extraordinarily advantageous feature of the present invention. The EAGLE interactive HTML generator is completely table-driven and is independent of the actual file and page definitions.

The EAGLE subroutines may be written in any CICS supported language.

Presently, and in contest to the present invention, the accessing of data on a mainframe from the Web is done using multi-tiered systems, most often, "screen-scraping". These systems routinely contain many different programming languages and require many different skill sets. These skill sets are often very different from the skill sets of the mainframe staff and require intense training and frequent use. Also, the multi-tiered systems require other computers to act as proxies for the mainframe, which adds a significant overhead cost. EAGLE cuts through these issues by operating on the mainframe using the language skills already possessed by the mainframe staff. EAGLE runs on the mainframe so that no extra machines are required for accessing the mainframe from the Web. This reduces the maintenance costs dramatically and reduces the number of points of failure as well. This methodology also cuts out the use of extra software products that not only add overhead to any transaction but also increase the complexity of the application and increase the difficulty of debugging errors.

Figure 2:
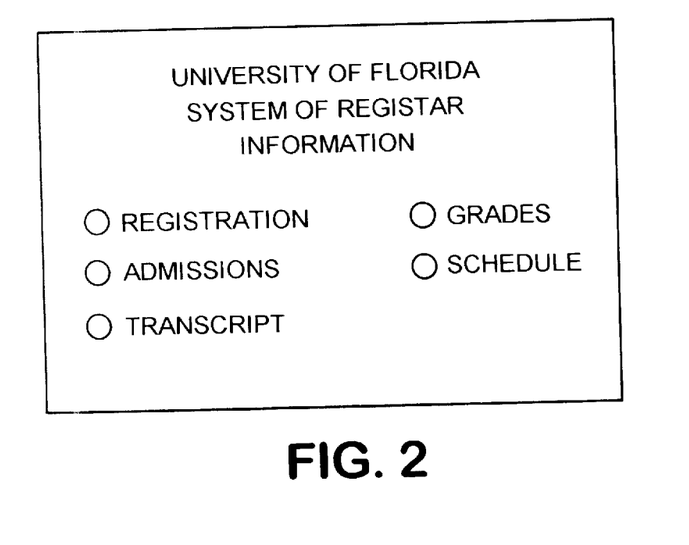
FIG. 2 is a simplified view of the appearance of a Web page according to the present invention.

Turning now to FIG. 2, a specific example of a Web page that may be generated by the present invention is shown. In this and the following the Web pages will be discussed in the context of a university, but it will be readily understood that the invention has applicability to other contexts. FIG. 2 is a menu page where various menu items are hypertext, meaning that a computer user at a computer 10 (FIG. 1) can click on (put mouse cursor at and press enter or press left mouse button) and thereby select one of the menu items. For example, clicking on GRADES, will allow a university student to access his or her grades.

Figure 3:
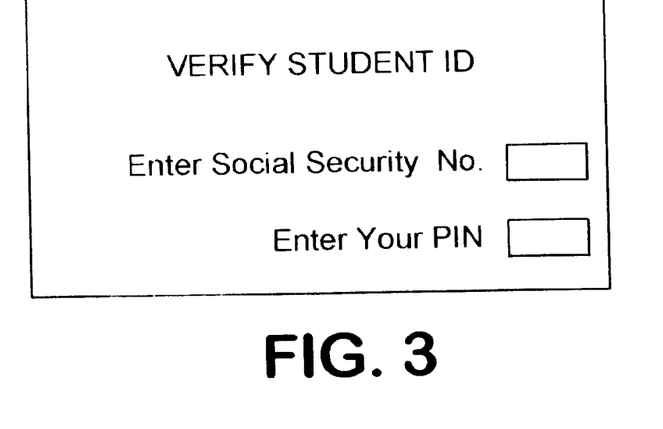
FIG. 3 is a simplified view of the appearance of an identification Web page according to the present invention.
Figure 4:
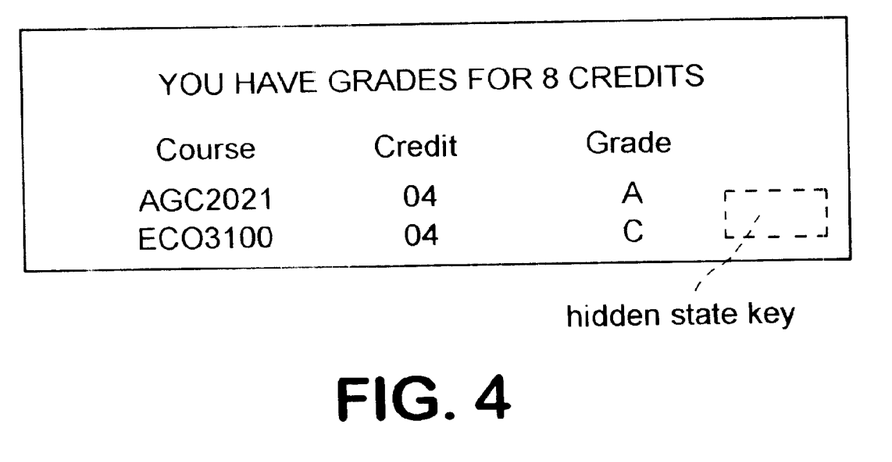
FIG. 4 is a simplified view of the appearance of a restricted Web page according to the present invention.

Before allowing access to the grades, the identification Web page of FIG. 3 requires the student to enter a student identification number and personal identification number. Upon the student supplying this information, the Web server 12 (FIG. 1) passes it to mainframe 16. The mainframe 16 generates a state key and incorporates the state key into the next Web page (FIG. 4) displayed for the student. Specifically, the state key is randomly generated as a session key for this particular student. The state key is hidden on the Web page, meaning that a browser will not display it. However, when the student goes to another Web page restricted to that student (for example going from grades to transcripts), the manner of insertion of the state key on the Web page ensures that the browser program running on the computer 10 transmits the state key to the Web server 12. The Web server 12 in turn supplies the state key to the mainframe 16. Upon mainframe 16 confirming that the state key corresponds to the student in question, the transcript of the student can be accessed. Importantly, a part of EAGLE on the mainframe 16 disables a given state key if the state key is not received for a given time interval (timeout period). This reduces the chances that someone can readily access the private records of a student who steps away from his or her computer without remembering to close the program. Other menu items of FIG. 2 may allow access to unrestricted information such as the course schedule for a coming semester. Such unrestricted information may be available without going through identification procedures or may require one to log in with a guest identification.

Figure 5A:
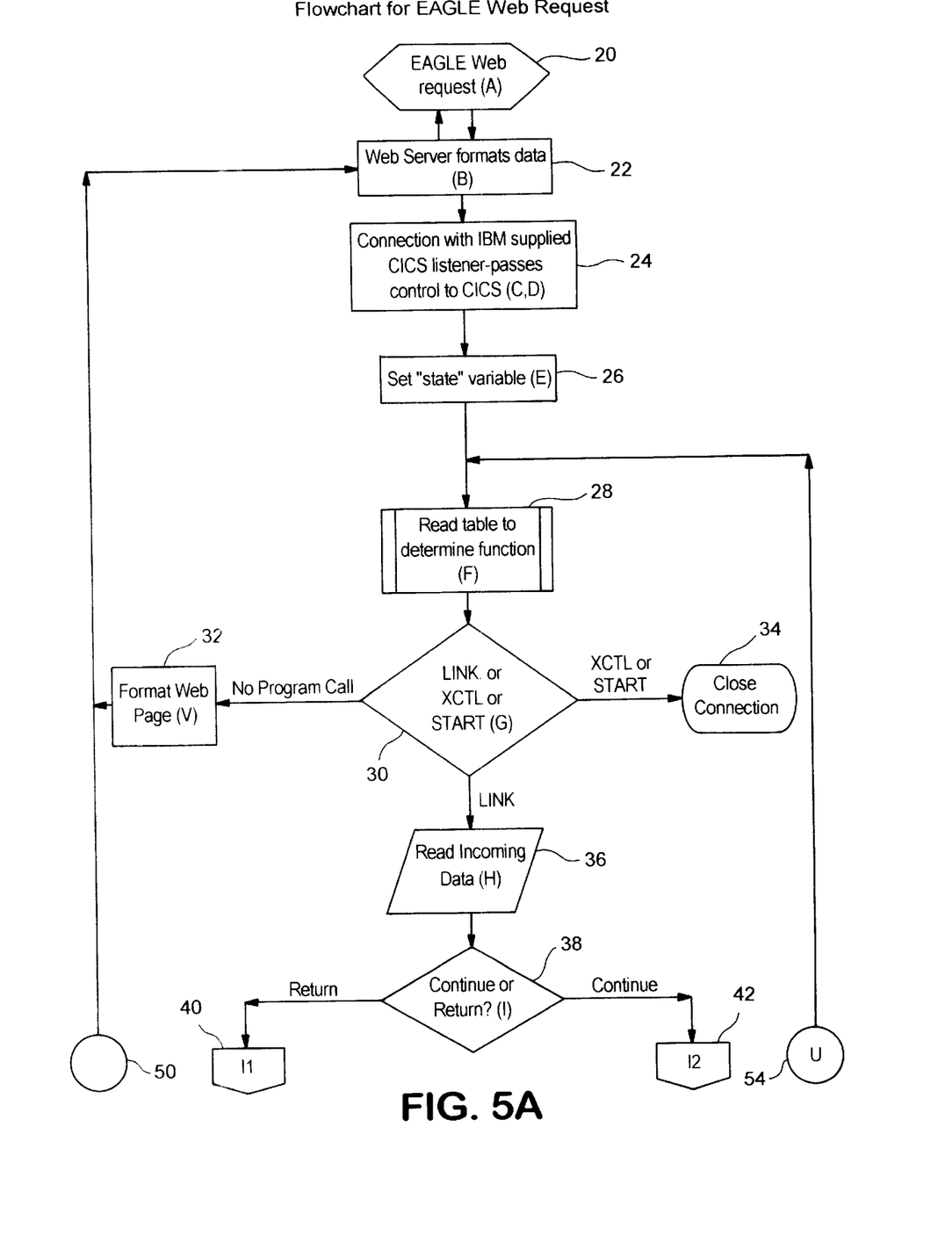
FIGS. 5A and 5B are parts of a simplified overall flowchart of the handling of a Web request for data.
Figure 5B:
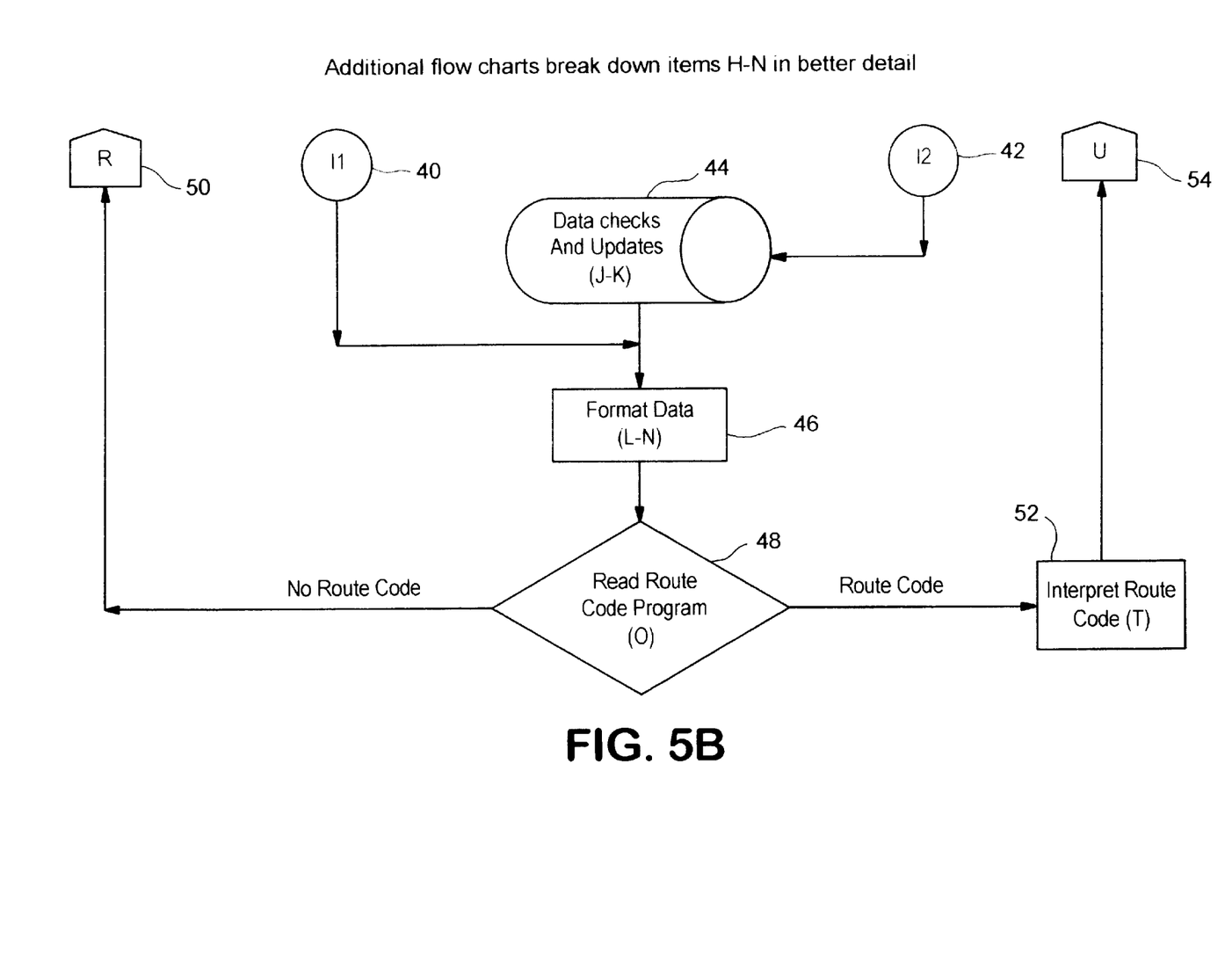

Turning now to the flowchart of FIGS. 5A and 5B (the latter being a continuation of FIG. 5A), the processing of a Web request for data will be discussed in detail. At block 20, a user at a computer 10 (refer momentarily back to FIG. 1) requests data from mainframe 16. The user's Web browser sends the request. At block 22, the Web server 12 formats the request such that mainframe 16 can respond. The mainframe 16 is running a CICS listener program such as supplied by IBM for use on its mainframes. At block 24, this passes control to CICS on the mainframe 16. Next, block 26 determines if the state key has been established and verified. If the particular data request requires a security, a screen such as FIG. 3 will prompt the user to enter information causing access authentication, and the association of access authentication to a state key. Next block 28 reads a primary function table to determine the functions required to supply the requested data.

The primary function table supplies the following:

program to execute, if applicable, whether to LINK, XCTL, or START appropriate program, files/tables called programs to be used, page definition table to be used, additional subroutines to call, route code definitions, additional data to be used with program, set update flag (Y/N, meaning yes or no), PIN/Password protected page (Y/N) (some actions such as dropping a course may require reentry of PIN to increase protection against someone taking over when an authorized user has left without closing the Web browser program), and call an external data source, if needed, supplies record key to table with all necessary information.

Block 30 then runs any program needed to respond to the request. If no program is called, block 32 simply formats a Web page and sends it back to the user via the Web server 12, which Web server may simply relay, without change, the Web page or may make minor insertions before supplying the Web page to the user. Block 32 puts together all the parts of the outgoing Web page including the page style, buttons, or other objects; the generated HTML, state key, and cache information. If XCTL or START is required, control goes to block 34 which then closes the connection.

If a LINK is made, a program on the mainframe is run Block 36 reads incoming data using page definition table. Further block 38 allows subroutines to determine whether to continue with this program at block 42 or at block 40 set a route code and return to the main routing routine. Data access uses one or more of the following methods: dynamic page definition and file definition tables, and fixed object module(s).

Block 44 updates files if appropriate and if data passes all edits. Block 46 formats data for display using one or a combination of the following methods: dynamic page definition and file definition tables, and fixed object module(s).

Block 48 reads route code. If none is set, control goes to block 50 such that HTML is sent to the Web server, which in turn sends a response to the Web browser on computer 10.

If the route code is set, block 52 interprets the route code, and via block 54, returns to main routing section at block 28.

Figure 6:
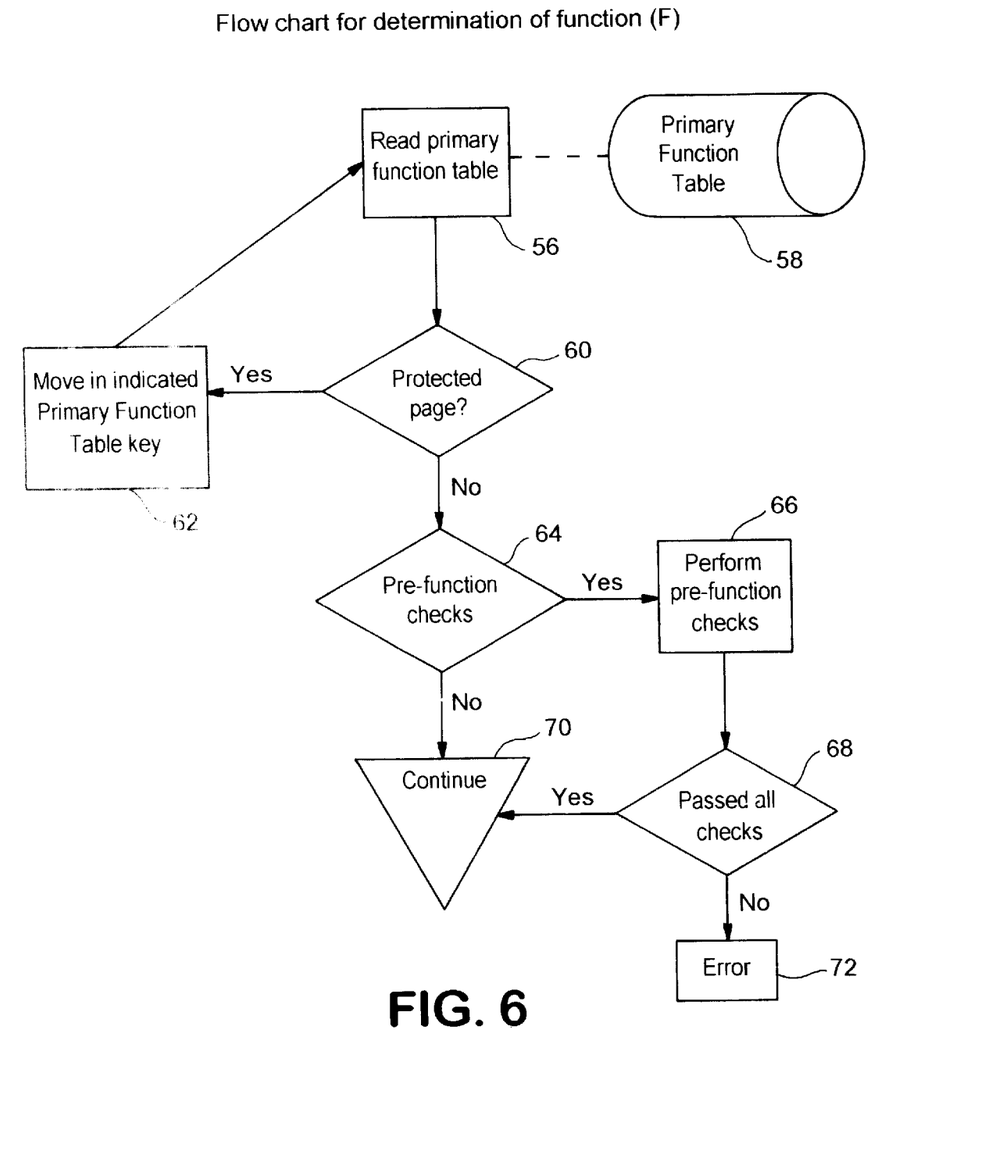
FIG. 6 is a flowchart of function determination, showing more details of parts of the flowchart of FIGS. 5A and 5B.

With reference now to FIG. 6, more details of block 28 of FIG. 5A will be given. At block 56, a primary function table 58 is read.

(A primary function table is given as Appendix 1 attached; a primary Web page format is attached as Appendix 2; a Web page forms and styles is attached as Appendix 3; a data access, edits, and layout definition is attached as Appendix 4: and a Web page object is attached as Appendix 5. These give specific examples of particular features used in the preferred embodiment.)

Block 56 leads to block 60 which tests if the page being requested is a protected page (i.e., restricted access). If so, block 62 returns a function to block 56 to test if the user is authorized. If block 60 determines that the page is not protected, control goes to block 64 which determines if pre-function checks are needed. If yes, block 64 leads to blocks 66 and 68 which perform the checks and determine if the checks were passed. If so, the data appears proper and control goes to the continue at 70. If not, an error is noted at block 72.

Figure 7:
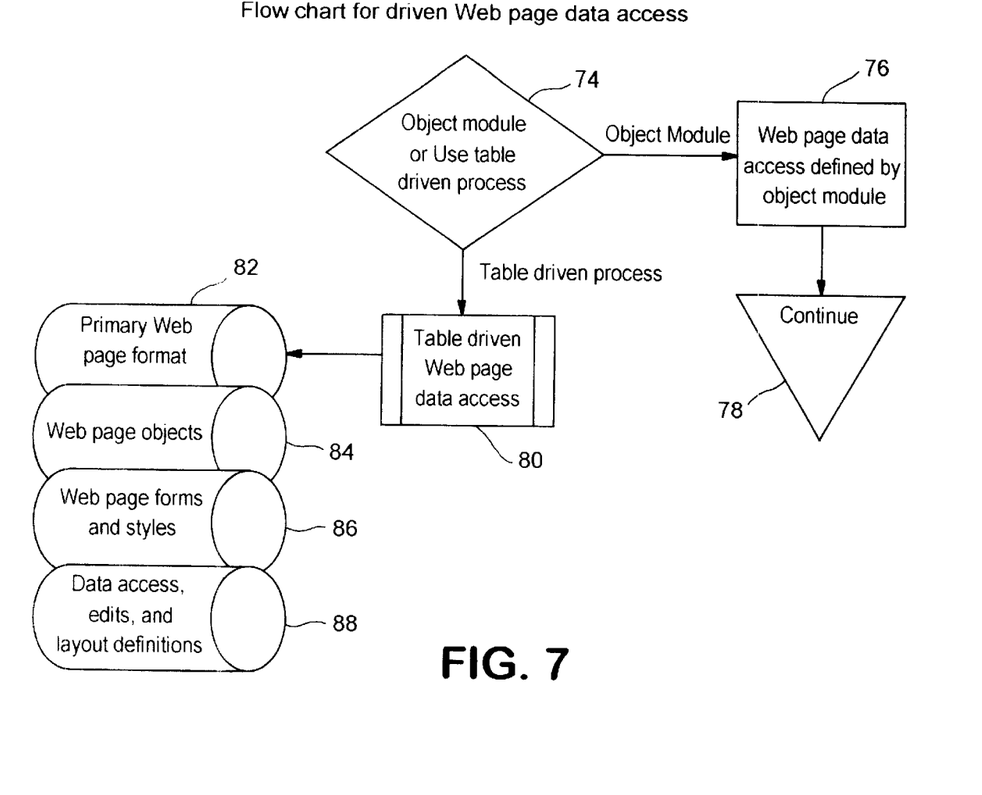
FIG. 7 is a flowchart of driven Web page data access.

Turning now to FIG. 7, a flowchart for driven Web page data access starts with block 74 which determines whether the page will use an object module. If yes, control goes to block 76 that provides Web page data access defined by the object module and leads to continue block 78. If no, a table driven process of data access at block 80 uses a primary Web page format 82, Web page objects 84, Web page forms and styles 86 and data access, edits, and layout definitions 88. Components 82 to 84 may be as shown on appendices 2 to 5.

Figure 8:
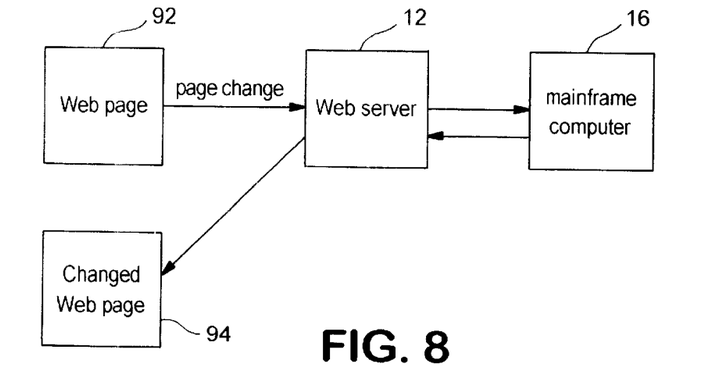
FIG. 8 is a simplified diagram illustrating a recursive Web page change feature of the present invention.

FIG. 8 is a simplified example of how the present invention allows one, with proper authorization, to change a Web page in a recursive manner. The Web page 92 is displayed at a user□s computer connected to Web server 12 and mainframe computer 16. The user uses the web browser program on his or her computer to send a page change command to server 12 and mainframe 16. This page change command, causes the generation of a revised version of the original Web page, this being changed Web page 94. The revision may include different formating, style, data, etc., but will replace the old Web page 92. The page change command, as used herein, changes the appearance of the original Web page, meaning that it causes the Web page to appear differently to all who access it by causing it to display data from the computer storing the Web page. As used herein, "changes the appearance" or "changing the appearance" shall not include simply appending user comments or designs to a Web page as is common for Web-based bulletin board or public comment boards. By allowing recursive control (controlling a given Web page from that Web page being on a person□s browser, not on the person□s Web page editor program) of Web pages, the management of a large Web site can be quite efficiently performed.

Attached as appendices A, B, C, D, E, F, G, and H are copyrighted programs which run on a mainframe computer in a specific implementation of the invention. Attached as appendix J is a copyrighted program in C called Nirvana and which runs on the web server computer in a specific implementation of the invention. Certain non-critical information such as ports that are used on the actual implementation have been changed or left out to reduce exposure to unauthorized persons overcoming security measures in a specific implementation of the technique.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A method of providing Web access to data, the steps comprising:

providing a Web server for distribution of data to users;

providing a database on a mainframe database computer operably connected to the Web server, the database having a database program that provides data in a given format;

providing a Web control program on the database computer;

having a user supply an identification code to the Web server, the Web control program then generating a state key and incorporating the state key into a Web page supplied to that user, and wherein the database computer, outside of the Web server, detects the state key from the Web page upon the user requesting data and decides whether that user can access the requested data based on the state key; the state key thus allowing the user to access otherwise restricted data from the database computer.

2. The method of claim 1 wherein the state key loses its ability to authorize data access if it is not sent by the user to the database computer at least once during a time-out interval.

3. The method of claim 2 wherein the Web server is on a Web server computer different from the database computer.

4. The method of claim 3 further including the step of forwarding the identification code from the Web server to the database computer.

5. The method of claim 1 wherein the state key is randomly generated for a given access session.

6. A method of providing Web access to data, the steps comprising:

providing a Web server for distribution of data to users;

providing a database on a database computer operably connected to the Web server, the database having a database program that provides data in a given format; having a user request data in the database, the Web server then forwarding the request to the database, the data base program then accessing the data in the given format, the database computer then running a Web control program that generates a Web page with the requested data and supplies the generated Web page to the user, wherein said Web server is on a Web server computer different from the database computer; said database computer is a mainframe computer and further including the steps of: having a user supply an identification code, the Web control program then generating a state key, incorporating the state key into a Web page supplied to that user, and wherein the database computer detects the state key from the Web page upon the user requesting data and decides whether that user can access the requested data based on the state key.

7. A method of managing a Web site, the steps comprising:

providing a Web control program on a computer; having the Web control program receive a page change command from a user using a Web browser to access the Web site; and, responsive to the page change command, having the Web control program change a given Web page to a changed Web page, in response to the page change command from a user using a Web browser to access the Web site and without the Web browser being in any editing mode, such that any users accessing the given Web page now receive the changed Web page, the page change command changing the appearance of a given Web page, the Web browser thus editing the given Web page for any users who access it without requiring a switch into any editing mode; wherein the Web control program marries file definition objects and page definition objects to generate Web pages; wherein the computer having the Web control program is a mainframe computer and users request data on the mainframe computer via a Web server on a Web server computer; wherein the Web control program generates HTML through a completely table driven process, independent of file definitions and page definitions, and further including the steps of: having a user supply an identification code, forward the identification code from the Web server computer to the mainframe computer, the Web control program then generating a state key, incorporating the state key into a Web page supplied to that user, and wherein the mainframe computer detects the state key from the Web page upon the user requesting data and decides whether that user can access the requested data based on the state key.

8. A method of providing Web access to data, the steps comprising:

providing a Web server for distribution of data to users;

providing a database on a database computer operably connected to the Web server, the database having a database program that provides data in a given format;

having a user request data in the database, the Web server then forwarding the request to the database, the database program then accessing the data in the given format, the database computer then running a Web control program that generates a Web page with the requested data and supplies the generated Web page to the user, the Web control program, outside of the Web server, then putting markup language on the data to generate a Web page and such that a Web page is dynamically generated outside of the Web server; wherein:

said Web server is on a Web server computer different from the database computer; said database computer is a mainframe computer; and the method further includes the steps of: having a user supply an identification code, forwarding the identification code from the Web server computer to the mainframe computer, the Web control program then generating a state key, incorporating the state key into a Web page supplied to that user, and wherein the mainframe computer detects the state key from the Web page upon the user requesting data and decides whether that user can access the requested data based on the state key.

9. The method of claim 8 wherein the state key is randomly generated for a given access session and the state key loses its ability to authorize data access if it is not sent by the user to the mainframe computer at least once during a time-out interval.

* * * * *